J. A. STEINMETZ.
AUTOMOBILE THEFT INDICATOR.
APPLICATION FILED JUNE 25, 1914.
1,142,639.
Patented June 8, 1915.
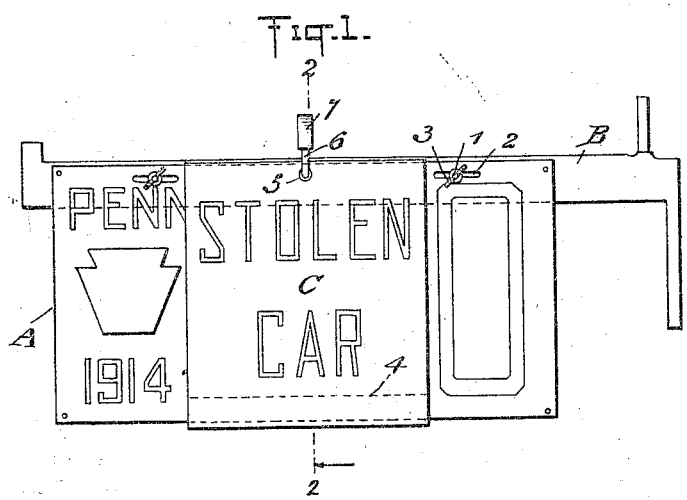
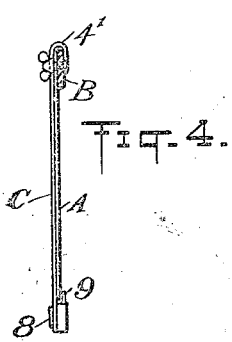
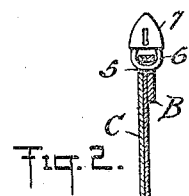
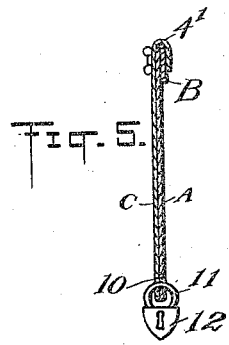
INVENTOR
Joseph A. Steinmetz
BY
ATTORNEY.
Witnesses:

UNITED STATES PATENT OFFICE.

JOSEPH A. STEINMETZ, OF PHILADELPHIA, PENNSYLVANIA.

AUTOMOBILE THEFT-INDICATOR.

1,142,639.   Specification of Letters Patent.   Patented June 8, 1915.

Application filed June 25, 1914. Serial No. 847,354.

*To all whom it may concern:*

Be it known that I, JOSEPH A. STEINMETZ, a citizen of the United States, and a resident of Germantown, Philadelphia, Philadelphia county, and State of Pennsylvania, have invented a new and Improved Automobile Theft-Indicator, of which the following is a full, clear, and exact description.

This invention relates to a device which is designed to prevent the theft of automobiles which the drivers are obliged to leave standing at the curb for any reason.

Heretofore various means have been provided for rendering the automobile inoperative, as, for instance, gasolene-locked valves, ignition circuit cutouts, controller lever locks and steering post locks. These have been found objectionable for various reasons, so that they are not applied to cars in present use.

The object of the present invention is not to render the automobile supposedly inoperative, but to provide means which will have a deterent effect upon persons who would otherwise steal the car. Therefore, the invention contemplates the obscuring, blinding or obliterating of the serial number of a license tag or a part thereof, so that any person operating a car with the license so concealed would be a violator of the law and thereby render himself liable to arrest. In all cities there are stringent regulations compelling the conspicuous display of license tags at all times, and consequently when a license is concealed, as contemplated by the present invention, the policemen and secret service officials are immediately aware of the fact that a person driving a car with a concealed license is presumably not only a violator of the law but a thief. The license tag covering means will be used only when the car is left standing for any reason, and when the user returns to the car he will of course first remove the license tag cover so as to expose the serial number.

In carrying out the invention the cover is so designed that it can be applied to a license tag of standard requirements so as to be in the nature of an attachment which can be readily applied or taken off, and when applied the cover will be locked securely in place, so that to remove it without a key will compel a resort to tools, which would immediately indicate that a person is attempting to steal the car.

In another embodiment of the invention the cover and license tag or plate can be combined as a unitary article and embodied with the usual license tag bracket ready to be fastened to a car, and in this embodiment the cover can be swung to an open position so as to expose the license tag, or to a closed position over the tag to conceal the serial number, and in such latter position the cover will be suitably locked in place. The license tag cover may with advantage be painted some distinctive color different from the usual license tag color and bearing the legend "Stolen car" or equivalent words, so that the officers of the law can see at a glance that there has been a theft of the car which is driven with a license tag covered in the manner mentioned.

For a more complete understanding of the invention, reference is to be had to the accompanying drawings which illustrate certain embodiments of the invention and wherein similar characters of reference indicate corresponding parts in all the views, and in which—

Figure 1 is a front view of the simplest form of the invention shown applied to a license tag and bracket; Fig. 2 is a vertical section on the line 2—2, Fig. 1; Fig. 3 is a front view of a modified form of the invention; Fig. 4 is a vertical section on the line 4—4, Fig. 3; and Fig. 5 is a vertical section of a license cover such as shown in Fig. 3, with the exception that a modified form of locking means is provided.

Referring to the drawings, A designates a license tag or plate of standard design, which is shown in the present instance attached to the usual supporting bracket B that is fastened to the chassis of the automobile, the license plate being fastened to the bracket in any suitable manner, as, for instance, by bolts 1 passing through the bracket and through slots 2 of the license plate, and on the bolts are wing or other nuts 3. Of course, the license plate can be strapped to the axle or any other suitable part of the vehicle by straps passing through the slots 2. The license plate is adapted to be obscured, blinded or obliterated by a cover C which is shown in the present instance as a rectangular plate which has at one edge a bent-back flange 4 to form a hook which may be engaged with the bottom edge of the license plate A, as shown in Figs. 1 and 2, or with the top edge as shown in Figs. 3, 4 and 5, but in this latter group of figures, the bent-back flange or hook 4' is open enough to embrace the license plate supporting bracket B. The edge of the cover plate opposite from the hook-shaped flange 4 or 4' is adapted to be fastened with respect to the license plate by suitable locking means. In the arrangement shown in Figs. 1 and 2 the license plate A, bracket B and cover C are provided with alining openings 5, so that the yoke or loop 6 of an ordinary padlock 7 can be passed through the openings and thereby lock the cover plate in place. In Figs. 3 and 4 the locking device 8 is arranged at the bottom of the cover plate C, and is shown as of the tumbler type, and on the rear of the plate is the bolt 9 which engages behind the license plate, as shown in Fig 4. In Fig. 5 the license and cover plates A and C are provided with registering openings 10 to receive the yoke or loop 11 of a padlock 12. With these various forms of license tag covers it will be understood that when the car is in use and traveling, the license cover will be of course removed and carried on the vehicle in some convenient place. When the driver gets out and intends to leave the car he will apply the license plate cover and lock it over the license plate so that it will be impossible for anyone to use the car without the police and secret service officials knowing that the car is being driven by an unauthorized person, who should of course be arrested not only for failure to reveal the serial number of the license but for theft of the car. When the owner or driver returns to the car he will of course unlock the license plate cover and remove it from the license so as not to render himself liable to arrest.

The front face of the cover will preferably be painted a color contrasting with the usual color of the license plate, and it may also bear the legend "Stolen car" or equivalent words.

From the foregoing description taken in connection with the accompanying drawings, the advantages of the construction and method of operation will be readily understood by those skilled in the art to which the invention appertains, and while I have described the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. As a new article of manufacture, an automobile theft-preventing device in the form of a license plate cover, said device comprising a plate having a hook at one edge and disposed at the rear for hooking over the edge of the license plate, and a lock at the opposite edge to engage the license plate and coöperate with the said hook to hold the device in covering position on the license plate.

2. The combination of an automobile license bearing element, with a cover adapted to conceal the serial number of the license, and detachable means connecting and locking the cover on the said element.

3. The combination of an automobile license plate, with a detachable cover therefor having a hook at one edge to engage over an edge of the plate, and means for locking the license plate and cover together.

4. The combination of a license plate and a supporting bracket therefor, with a detachable cover adapted to conceal the license plate, and means for locking the cover and license plate and bracket together.

5. The combination of a license plate and a supporting bracket therefor, with a license cover comprising a plate having one edge bent into a hook-shaped flange to engage an edge of the license plate, and a locking means for securing the cover and license plate and bracket together.

6. The combination of a license plate and a supporting bracket therefor, with a license cover comprising a plate having only one edge bent into a hook-shaped flange to engage an edge of the license plate, said bracket and license plate and cover having registering openings, and a lock having its yoke passing through the openings.

In testimony whereof I have signed my name to this specification in the presence of two subscribing witnesses.

JOSEPH A. STEINMETZ.

Witnesses:
    E. KENNETH NASON,
    H. G. VAN COURT.